Sept. 18, 1928.

R. W. KENNARD 1,684,995

MILK BOTTLE CARRIER

Filed July 18, 1927

Roy W. Kennard,
INVENTOR

BY Victor J. Evans
ATTORNEY

WITNESS:

Patented Sept. 18, 1928.

1,684,995

UNITED STATES PATENT OFFICE.

ROY W. KENNARD, OF HARPER, WASHINGTON.

MILK-BOTTLE CARRIER.

Application filed July 18, 1927. Serial No. 206,710.

The object of this invention is the provision of a carrying means for milk bottles and the like that is constructed to include a wire frame having a handle at one end, a ring surrounding the frame and secured thereto adjacent to its other end, and providing, with the bottom of the frame, a holding member for the milk bottle, while slidable on the frame there is a clamp that has a central ring portion that is movable over the neck of the milk bottle and whereby a milk bottle can be readily arranged in the frame, easily removed therefrom and carried with convenience and safety.

To the attainment of the foregoing the invention consists in the improvement as hereinafter described and definitely claimed.

As disclosed by the drawings I make use of a substantially rectangular frame 1. The frame is preferably constructed of wire, and in the showing of Figure 1 of the drawings, there is attached to the arms of the frame, at the top thereof, a wooden handle 2, while in Figure 2 of the drawings the angle elements constituting the top of the frame are arranged in lapping relation and are soldered or otherwise connected.

Figure 1:
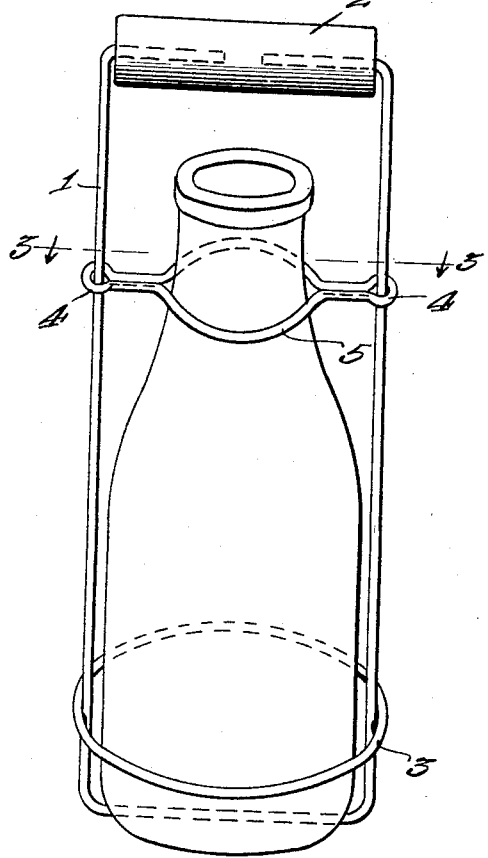
Figure 1 is a perspective view of the improvement showing a milk bottle supported therein.
Figure 2:
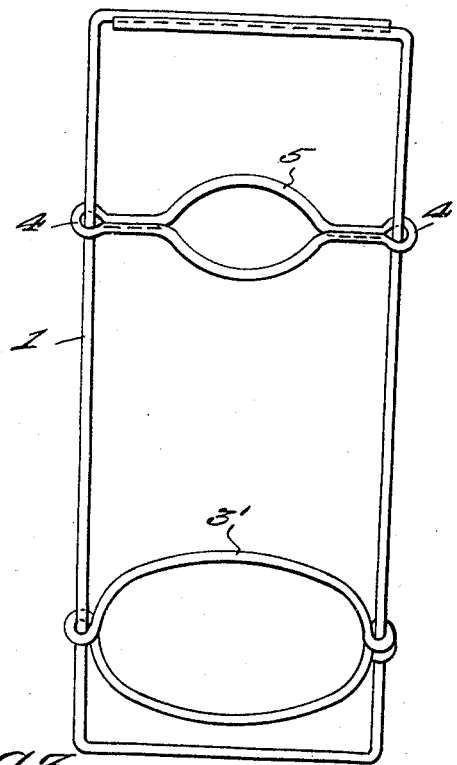
Figure 2 is a similar view but illustrating a slight modification.
Figure 3:
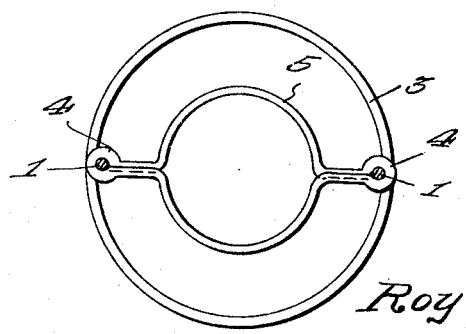
Figure 3 is a sectional view approximately on the line 3—3 of Figure 1.

Surrounding the frame at a suitable distance above the top thereof there is a ring 3. In the showing of Figure 1 this ring is soldered or otherwise connected to the frame, while in Figure 3 the ring 3' is centrally coiled upon itself to embrace one of the arms of the sides of the frame and its ends are coiled around the second side member of the frame and if desired secured thereto. Preferably, in Figure 2 of the drawings the side members are arranged angularly with respect to each other, so that the ring 3' need not be secured to the frame as the coiled portions thereof will frictionally engage with the angle sides to hold the said ring a suitable distance from the bottom thereof. On each of the frame members there is a slidable clamp which is also preferably constructed of wire. The clamp includes eye portions 4 through which the side members of the frame pass and a central ring portion 5 that is movable over the neck of a milk bottle.

With my improvement a milk bottle may be easily and effectively seated in the frame and likewise effectively sustained thereon by the movable clamp. In a like manner the milk bottle may be quickly removed from the frame. The device provides a simple structure whereby milk bottles may be supported and conveyed without liability of slippage or breakage and in a manner most convenient to the user of the improvement.

It will be apparent that the slidable ring clamp 5 having the eye portions engaging the arms 1 of the substantially rectangular frame will at all times retain the arms provided by the split upper end or handle portion of the frame in proper alinement with each other, so that liability of the frame, at this portion thereof becoming disassociated will be effectively prevented.

Having described the invention, I claim:—

A bottle holder comprising a wire frame of substantially rectangular formation and having its upper arms split to provide a handle portion, a ring member surrounding the frame adjacent the bottom thereof, a second ring member of a less area than the first mentioned ring member having arm extensions which merge into eyes that are slidable upon the side members of the frame, and by virtue of such engagement with the said side members the said clamp tends to hold the split ends of the frame in parallelism.

In testimony whereof I affix my signature.

ROY W. KENNARD.